United States Patent [19]
Casey et al.

[11] Patent Number: 5,297,857
[45] Date of Patent: Mar. 29, 1994

[54] DIRECT ACTING ELECTRO-HYDRAULIC BRAKING SYSTEM WITH REGULATED LEAK RATE

[75] Inventors: Gary L. Casey, Troy; Daniel J. Patient, Sterling Hgts., both of Mich.

[73] Assignee: Allied-Signal Inc., Morristown, N.J.

[21] Appl. No.: 708,413

[22] Filed: May 31, 1991

[51] Int. Cl.5 .............................................. B60T 13/18
[52] U.S. Cl. ........................... 303/11; 303/DIG. 2; 303/DIG. 3; 303/20; 303/3; 303/84.1; 303/87; 303/113.4
[58] Field of Search ........... 303/84.1, DIG 1, DIG 2, 303/10, 11, 68, 49, 87, 3, DIG 4, DIG 3, 113 SS, 116 R

[56] References Cited

U.S. PATENT DOCUMENTS

| | | | |
|---|---|---|---|
| 3,713,703 | 1/1973 | Brown et al. | 303/10 |
| 3,717,383 | 2/1973 | Altmeppen | 303/10 |
| 3,887,238 | 6/1975 | Bennett | 303/10 X |
| 4,398,252 | 8/1983 | Frait | 303/20 X |
| 4,681,374 | 7/1987 | Nakamura et al. | 180/197 X |
| 4,794,267 | 12/1988 | Stevens | 303/84.1 X |
| 4,850,650 | 7/1989 | Eckert et al. | 303/100 X |
| 4,969,756 | 11/1990 | Villec et al. | 303/3 X |
| 5,058,961 | 10/1991 | Mergenthaler et al. | 303/115 PP |
| 5,154,495 | 10/1992 | Volz | 303/113 SS |

Primary Examiner—Robert J. Oberleitner
Assistant Examiner—Lee W. Young
Attorney, Agent, or Firm—Markell Seitzman

[57] ABSTRACT

A system and method of controlling pressure in a wheel brake cylinder of a brake. The hydraulic cylinder is connected to an electrically driven pump and a flow control valve is connected between the pump and the wheel cylinder. The system and method operate to control the speed of a motor driven pump to generate a desired pressure in a cylinder of the brake; generate a differential pressure, in the flow control valve, proportional to pump flow and communication same to a spring biased valving element; cause the valving element to move, in response to pressure forces acting on the valving element, generated by the pressure differential, and the force of the bias spring, so as to selectively open and close an associated exhaust port, connected to a drain or sump, such that in the steady state an equilibrium condition is achieved where the pressure forces balance the spring force and the pressure in the hydraulic cylinder is constant.

8 Claims, 2 Drawing Sheets

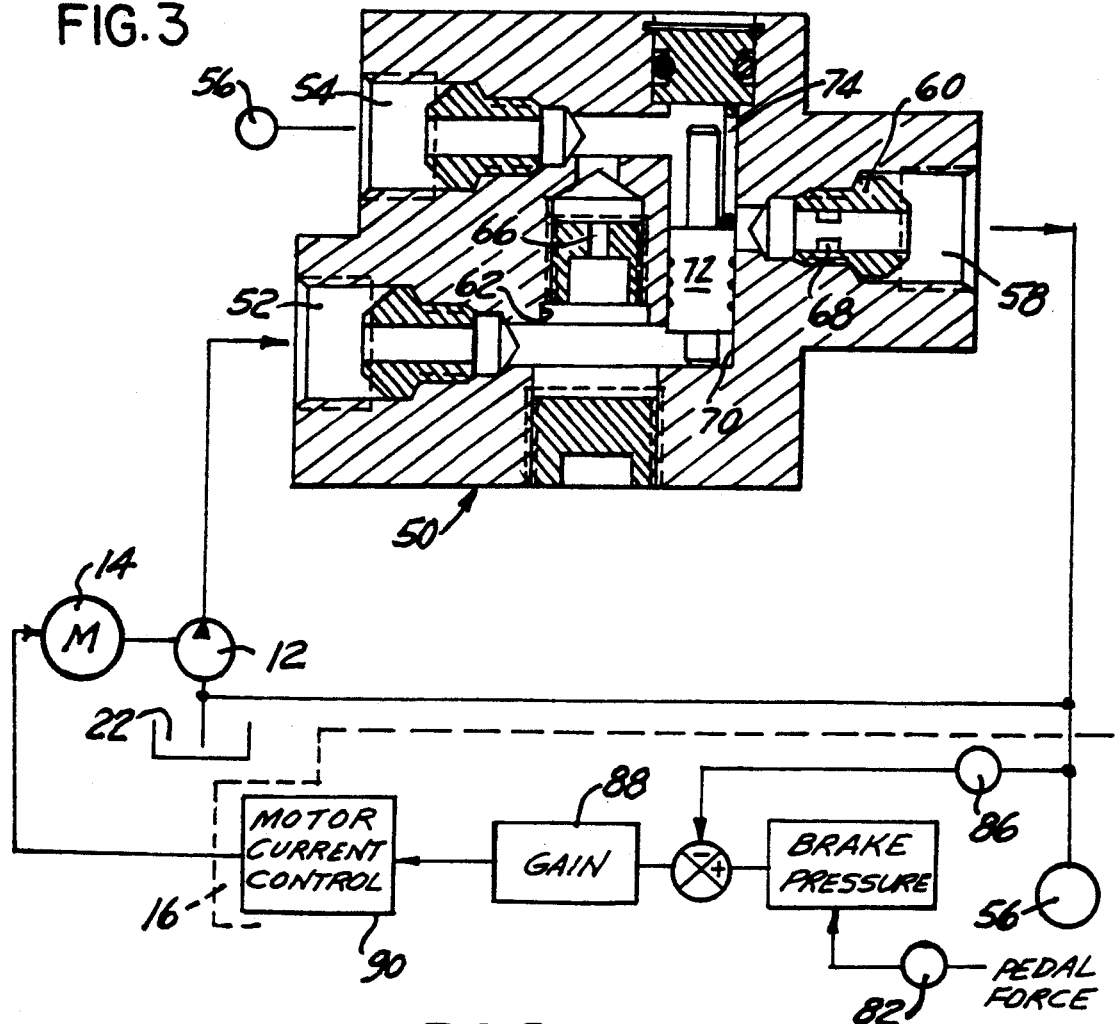
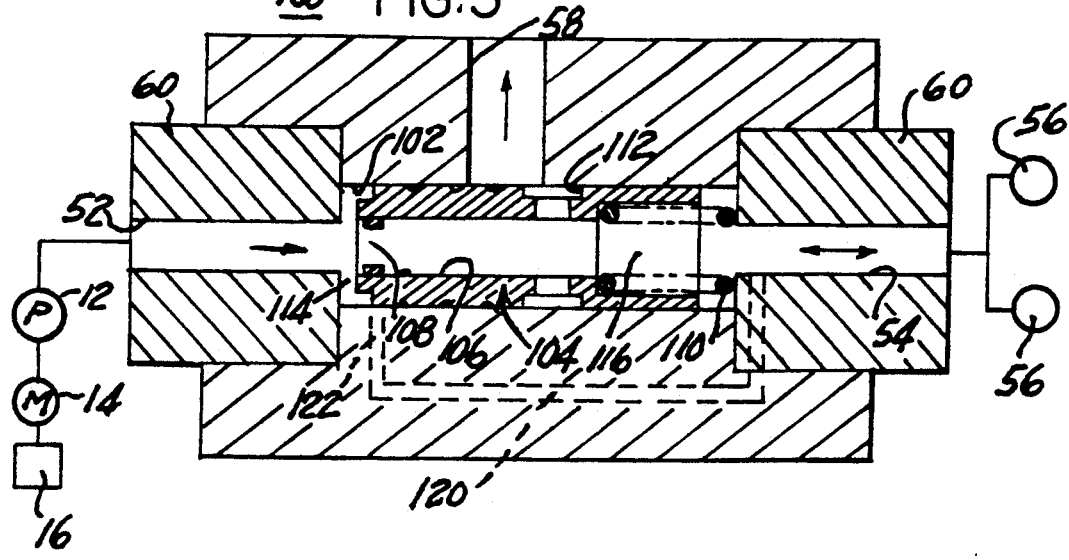

DIRECT ACTING ELECTRO-HYDRAULIC BRAKING SYSTEM WITH REGULATED LEAK RATE

BACKGROUND AND SUMMARY OF THE INVENTION

The present invention generally relates to an electro-hydraulic braking system in which the braking force acting upon a service brake is generated by an electrically controlled pump.

A simplified version of this system is shown in FIG. 1. This system 10 comprises a pump 12 powered by a motor 14 in response to control signals by an electric control unit (ECU) 16. The pump 12 directly pressurizes a brake system generally shown as 18. The speed of the motor 14/pump 12 is controlled to modulate brake system pressure in accordance with a commanded brake pressure signal. In the system shown in FIG. 1, brake system pressure varies with motor speed. In order for the brake system pressure to decay or decrease quickly, fluid within the brake system must flow to a drain or sump 22. The speed of the pressure decay can of course be increased dramatically if the pump direction is reversed, however, this adds to the complexity of the system. As can be appreciated, when the pump speed is slowed or when the pump is brought to a halt, brake system pressure will decay through the internal leak passages 24 of the pump, however, the time required for such decay is relatively long. One solution is to add an orifice (an additional leak path) in parallel with the pump 12 to speed the brake pressure decay. This approach requires that the pump capacity or displacement be increased since the pump now must be sized to supply the leakage flow as well as to adequately pressurize the brake system 18. If a fixed orifice 26 is used, it is impossible to size this orifice to provide a sufficient decay at low brake system pressure without increasing the flow at high pressure to a point that the pump 12 cannot maintain this pressure. One approach to solving the problem at hand is to add a flow regulator in a passage such as the passage in which the orifice 26 is located. One problem with this approach is that during the brake apply portion of the braking cycle the pump 12 is required to provide flow to the brake as well as to supply bypass flow.

It is an object of the present invention to provide an improved direct acting electro-hydraulic braking system. In this improved system a flow regulator is added to the braking system shown in FIG. 1 to modulate the leak rate. The time required to decay brake pressure at low pressure levels is reduced and at the same time, leakage at high brake system pressures is minimized. The present invention provides a simple and compact way to regulate a leak or bypass rate at all operational pressures. In the preferred embodiment of the present invention a flow regulator is added to the system to modulate the leak rate, the decay at low pressure is improved and at the same time leakage at high pressures is minimized. Therefore, when the pump output flow is very high (during the fill mode) the bypass flow is completely shut off. After brake pressure reaches the desired value and the pump slows, the regulator starts to increase the bypass rate. If the pump is stopped completely (when a lower brake pressure is desired) the bypass is open fully, causing a rapid reduction in brake pressure. Alternate embodiment of the invention shows an inline flow regulator.

As will be shown from the description below, brake pressure decay can be achieved without the use of auxiliary control valves and by modulating motor speed is all that is required to obtain a full range of apply, hold and decay rates in brake pressure.

Accordingly, the invention comprises: a system and method of controlling pressure in a wheel or brake cylinder of a brake. In the preferred embodiment of the invention a hydraulic wheel cylinder is connected to an electrically driven pump and a flow control valve is connected between the pump and the wheel cylinder. In one embodiment of the invention the flow control valve comprises a flow control regulator with a bypass passage. In another embodiment of the invention an inline flow control regulator is used. The system and method operate to control the speed of a motor driven pump to generate a desired pressure in a cylinder of the brake. The controlled pump flow generates a differential pressure in a flow control valve as a function of pump flow. This pressure differential is communicated to a spring biased valving element, which is part of the flow control valve, that causes the valving element to move, in response to pressure forces acting on same, generated by the pressure differential, and the force of the bias spring. The valve element, in response to these forces selectively opens and closes an associated exhaust port, connected to a drain or sump, such that in the steady state an equilibrium condition is achieved where the pressure forces balance the spring force and the pressure in the cylinder is constant.

Many other objects and purposes of the invention will be clear from the following detailed description of the drawings.

BRIEF DESCRIPTION OF THE DRAWINGS

In the drawings:

FIG. 3 illustrates a more detailed view of a flow control valve.

FIG. 5 illustrates another embodiment of the present invention.

DETAILED DESCRIPTION OF THE DRAWINGS

Figure 1:
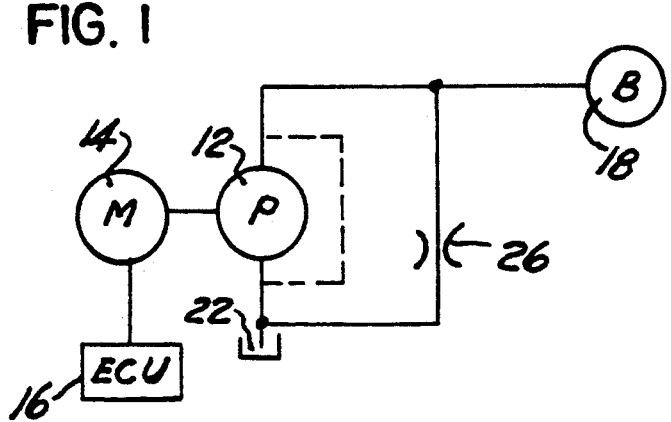
FIG. 1 illustrates a block diagram showing the main components of an electro-hydraulic brake system.
Figure 2:
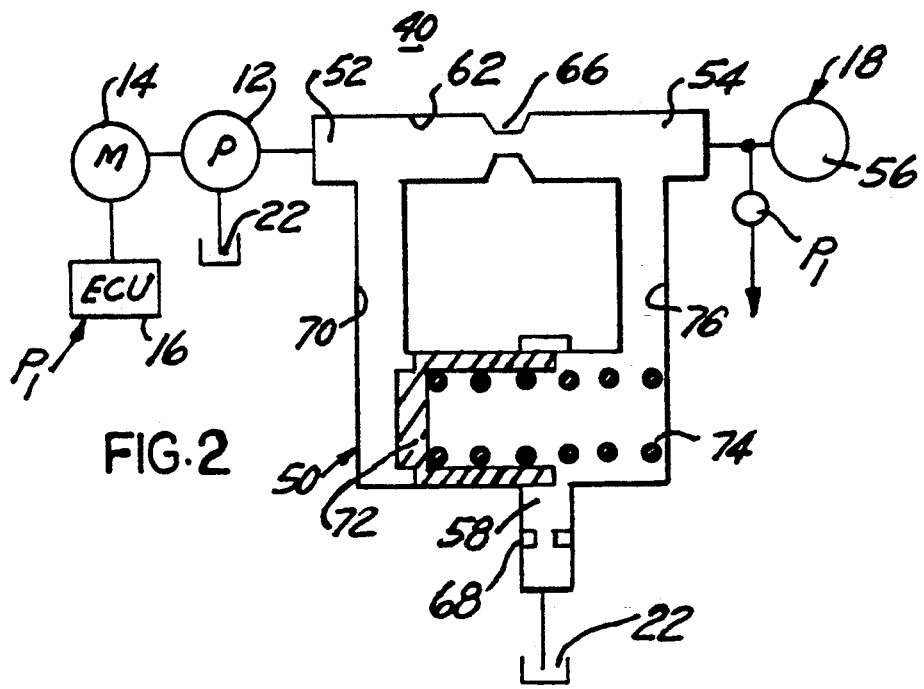
FIG. 2 illustrates a schematic diagram of a system incorporating the teachings of the present invention.

Reference is made to FIGS. 2 and 3. FIG. 2 schematically illustrates a system 40 for directly pressurizing a brake system generally shown as 18. FIG. 3 shows a more detailed view of a flow regulating valve 50. The system comprises a pump 12 which is powered by an electric motor 14 which in turn receives a control signal from an ECU 16. The output of the pump is connected to a flow regulator valve generally shown as 50. The valve 50 has an inlet port 52 connected to the pump 12, an outlet port 54 is connected to various wheel cylinders 56, and a bypass or exhaust port 58 is connected to a sump 22. To facilitate connection of the valve 50 to external fluid lines the various ports may comprise an SAE inverted flair fitting 60 of known construction. The valve 50 includes a first flow passage 62 which incorporates a bypass control flow orifice 66. This orifice is sized to produce a pressure drop of about 10% of maximum pump pressure (typically about 100 psi). The bypass or exhaust port 58 may optionally include an outlet orifice 68, which could be incorporated into the flair fitting 60. This outlet orifice is typically sized to produce the highest exhaust flow desired to release the brakes.

The valve 50 includes a bypass passage in parallel between the inlet and outlet ports, 52 and 54 respectively. Situated in the bypass passage is a slidable valve (shuttle) element 72 to selectively open and close the bypass port 58. A spring 74 biases the valve element 72 in a direction to open the exhaust Port 58. As shown in the FIGURES the spring 74 biases the valve element 72 to open communication between the exhaust port 58 and the output port 54. During the fill mode of the operation, that is when the pump is pressurizing the brake cylinders 56, the bypass control flow orifice 66 generates a pressure differential across the bypass passage 70. This pressure differential acts on the valve element 72. In the steady state an equilibrium condition is achieved where the pressure forces balance the spring force and the pressure in the brake cylinder 56 remains constant. As can be seen the valve element 72, in response to an increasing pump flow rate, moves against the spring 74 to partially or fully close the exhaust port in proportion to the pressure differential generated across the bypass control flow orifice 66. At high flow rates the valve element 72 completely closes the exhaust port 58 so that all of the pump flow is available to rapidly pressurize the brake cylinder 56. The pressure force across the bypass control flow orifice 66 is proportional to the square of the flow rate of fluid. A reduced pump flow causes a reduction in the pressure differential and permits the valve element 72 to move to partially or fully open the exhaust port 58, facilitating rapid pressure reduction at the wheel cylinder through passage 76.

FIG. 3 also illustrates a control system 80. Operator applied brake pedal force is sensed by a brake pedal force sensor 82 which is communicated to the ECU 16. Alternatively, if a master cylinder is used to control, for example the pressure in the front brakes, a pressure sensor could be used to directly monitor actual front brake pressure. The force signal is modified or scaled to obtain a desired brake pressure by block 84. If the brakes to be controlled are the rear brakes of the vehicle the block 84 will include a front-to rear proportioning which is vehicle specific. The output of block 84 is a commanded wheel cylinder pressure which is compared to a signal derived from another pressure sensor 86 which monitors actual wheel cylinder or brake line pressure. The ECU 16 compares the actual brake pressure to the desired pressure in block 84 to generate a pressure error signal which is operated upon by a gain function 88 which can include a proportional-integral-differential (PID) controller of known variety. The output of the gain function, or PID controller is input to a motor current control block 90 to generate a motor command signal such as commanded motor current.

Figure 4:
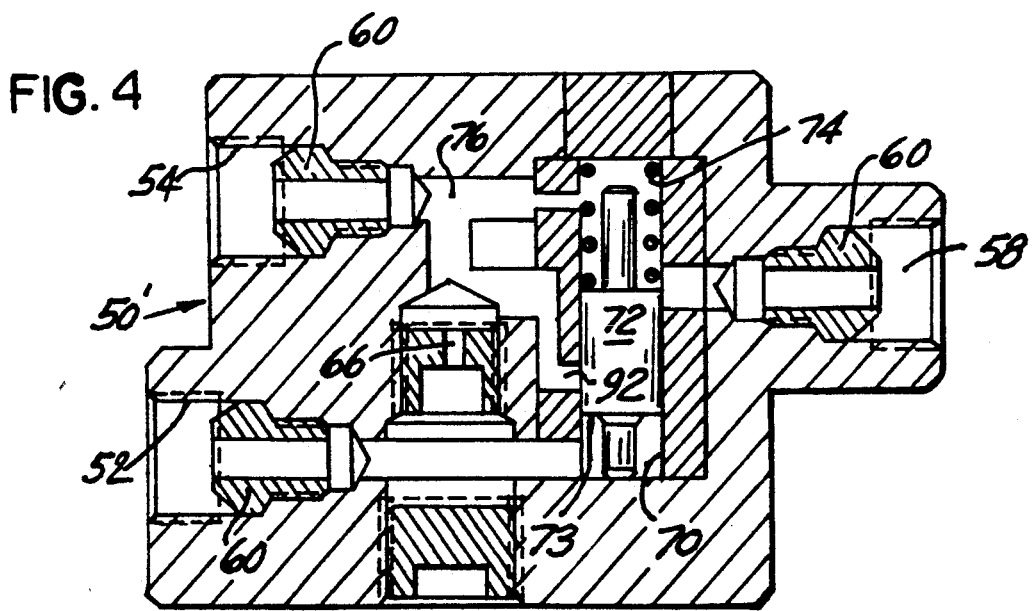
FIG. 4 illustrates an alternate embodiment of the present invention.

FIG. 4 illustrates another embodiment of the present invention. Incorporated in flow regulator 50' is an additional passage or ports 92 which connects passage 70 to the passage 76 downstream of the orifice 66. When brake pressure is increased at a high rate the pressure drop (i.e. pressure force) across the control orifice 66 exceeds that balanced by the spring 74. In this condition the valve element 72 moves to the completely close the bypass ports 58. In this position the additional passage 92 or port is opened by a downstream edge 73 of the valve element 72, allowing pump flow to pass directly to the wheel cylinder 56. This action limits the maximum pressure drop across the orifice 66 providing for the faster application of brake pressure. In all other aspects the operation of this valve 50' is the same of valve 50.

FIG. 5 illustrates an alternate embodiment of the invention showing an inline flow regulator valve 100 for a brake system. The valve 100 includes ports 52, 54, and 58 and passage 102 which interconnects the inlet port 52 with the outlet port 54. The valve element 104 is slidably situated in passage 102. The valve 100 includes an axial passage 106 which includes a metering orifice 108. A spring 110 biases the valve element oppositely relative to the direction of pump flow. The valve element 104 additionally includes an annular valve or bypass port 112. As can be seen under the influence of the spring 110 and as a function of the pressure drop across the orifice 108, the valve element 104 is movable to the right and permits the valve port 112 to communicate to the exhaust port 58. In this position a flow path is created to vent or decay fluid from each wheel cylinder 56 to the sump 22. When the brake pedal is depressed a signal indicative of operator applied braking force, as determined by a sensor such as 86, is communicated to the ECU 16. In response to brake pedal application, the motor 14 is energized and flow from the pump 12 enters the wheel cylinder 56. At high fluid flow rates there will exist a sufficient pressure drop across the metering orifice 108 to provide a large differential force which acts on the valve element 104. It should be noted that pump pressure in chamber 114 of the valve 100 is exposed to the area on the left hand side of the valve. In addition, wheel cylinder pressure exists in chamber 116 and is exposed to the area on the right hand side of the valve element 104. As can be appreciated, the forces acting on the valve element 104 during full speed operation of the pump 12 forces the valve element to the right end of the passage 106 fully closing the exhaust port 58. Consequently, all of the pump flow is available to quickly pressurize the wheel cylinder or cylinders 56. When less brake pressure is required, the pump output is reduced, causing a reduction in the pressure drop across the metering orifice 108. As this reduction in the pressure drop occurs, the valve element 104 moves to the left, opening the exhaust port 58 and reduces brake system pressure. An equilibrium condition wherein system brake pressure is maintained in a steady or hold condition exists when the pump flow (force) balances the valve spring force.

The valve 100 can be made to operate similar to valve 50' shown in FIG. 4 by adding a parallel flow path 120 defining an added port (both shown in phantom line). Port 122 is opened after valve port 112 closes, under high pump flow conditions to allow pump flow to pass directly to the wheel cylinder 16.

Many changes and modifications in the above described embodiment of the invention can, of course, be carried out without departing from the scope thereof. Accordingly, that scope is intended to be limited only by the scope of the appended claims.

We claim:

1. A method of controlling pressure in a wheel brake cylinder of a brake, the wheel cylinder connected to an electrically driven pump and wherein a flow control valve is communicated with the pump and the wheel cylinder and an exhaust port connected to a sump, the flow control valve includes a valving element biased by a bias spring, the method comprising the steps of:

(a) regulating the speed of a motor driven pump to generate a desired pressure in the cylinder of the brake;

(b) generating a pressure differential across the valving element, as a function of pump flow and communication same to the spring biased valving element;

(c) permitting the valving element to move, in response to pressure forces acting on the valving element, generated by the pressure differential, and the force of the bias spring, so as to selectively open and close the exhaust port, such that in the steady state an equilibrium condition is achieved where the pressure forces balance the spring force and the pressure in the cylinder is constant wherein step (a) of regulating includes:

(d) reducing the desired pressure from a given level and (e) slowing the speed of the pump to reduce the pressure differential thereby permitting the valving element to move to a position to more fully open the exhaust port enabling fluid in the cylinder to flow through the exhaust port and reduce pressure in the cylinder to the now desired reduced pressure level.

2. A method of controlling pressure in a wheel brake cylinder of a brake, the wheel cylinder connected to an electrically driven pump and wherein a flow control valve is connected between the pump and the wheel cylinder, the flow control valve includes a valving element biased by a bias spring, the method comprising the steps of:

(a) regulating the speed of a motor driven pump to generate a desired pressure in the cylinder of the brake;

(b) generating a pressure differential across the valving element, as a function of pump flow;

(c) permitting the valving element to move, in response to pressure forces acting on the valving element, generated by the pressure differential, and the force of the bias spring, so as to selectively open and close an associated exhaust port, connected to a drain or sump, such that in the steady state an equilibrium condition is achieved where the pressure forces balance the spring force and the pressure in the cylinder is constant, wherein step (a) of regulating includes the steps of:

(d) monitoring the pressure in the cylinder and comparing cylinder pressure to the desired pressure and (e) varying the speed of the pump to vary the pressure differential to achieve the desired pressure in the brake cylinder.

3. A brake system comprising:
a pump for pressurizing an associated wheel cylinder;
a motor for powering the pump;
first means for modulating motor speed in response to a signal indicative of desired braking effort and actual wheel cylinder pressure;
valve means, in series with the pump for regulating flow between the pump and wheel cylinder and for controlling the decay of fluid from the wheel cylinder during periods of pressure decay, including a pump port communicated to the pump, an output port communicated to the wheel cylinder and an exhaust port communicated to a drain or sump, such that is response to increased pump flow the exhaust port is selectively closed permitting pump flow to pressurize the wheel cylinder and in response to lessening pump flow the exhaust port is opened to a greater extent permitting fluid in the wheel cylinder to drain thereby reducing wheel cylinder pressure, wherein the valve means includes:
a first flow path interconnecting the pump port and the output port;
a first orifice in the first path for generating a pressure differential in proportion to pump flow rate across a shuttle valve wherein the motion of the shuttle valve is a function of the pressure differential across the first orifice to vary the amount that the exhaust port is opened and closed.

4. The system as defined in claim 3 including
a bypass path between the output port and the pump port situated across the first orifice such that the pressure differential is applied across the bypass path;
the shuttle valve means, being located in the bypass path, spring biased by a bias spring toward opening the exhaust port, and movable to open and close the exhaust port in relation to the bias force of the bias spring and to pressure forces resulting from the pressure differential, such that in response to increased pump flow the shuttle valve means is moved in a direction toward closing the exhaust port permitting pump flow to directly pressuzize the wheel cylinder and in response to lessening pump flow, corresponding to a reduced, desired wheel cylinder pressure, the shuttle valve means is moved in an opposite direction, in response to a reduced pressure differential, toward opening the exhaust port to permit fluid in the wheel cylinder to drain therethrough to reduce wheel cylinder pressure.

5. The system as defined in claim 3 wherein the first means includes:
second means for generating a signal indicative of operator applied brake pedal effort;
third means for generating a signal indicative of actual wheel cylinder pressure;
fourth means for generating a motor signal responsive to the difference between the pedal effort signal and the actual wheel cylinder pressure signal.

6. The system as defined in claim 4 wherein the exhaust port includes a second orifice where the size of the second orifice can be tailored to optimize system stability and pressure decay rate.

7. The system as defined in claim 4 wherein the first orifice and the bias spring are chosen to meet the following criteria: the bias force of the bias spring is of such magnitude that friction forces in the valve are effectively overcome and the valve responds reliably to small changes in pump flow, the size of the first orifice is chosen so that it is sufficiently large to permit rapid increases in brake pressure when desired, but not so large that excess flow would be required to maintain a constant brake pressure.

8. The system as defined in claim 4 including a flow passage opened by the shuttle valve means, in response an initial high pump flow sufficient to cause the shuttle valve means to move toward the exhaust port, to temporarily bypass fluid around the first orifice to the output port during such period of high pump flow to permit direct communication between the pump and the wheel cylinder.

* * * * *